United States Patent
Reis et al.

(10) Patent No.: US 8,600,326 B2
(45) Date of Patent: *Dec. 3, 2013

(54) GPS BASEBAND ARCHITECTURE

(75) Inventors: Ricardo Dos Santos Reis, Turcifal (PT); Carlos Azeredo Leme, Lisbon (PT)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/440,974

(22) Filed: Apr. 5, 2012

(65) Prior Publication Data

US 2012/0194384 A1    Aug. 2, 2012

Related U.S. Application Data

(63) Continuation of application No. 11/967,891, filed on Dec. 31, 2007, now Pat. No. 8,155,611.

(51) Int. Cl.
*H04B 1/06* (2006.01)

(52) U.S. Cl.
USPC .................. 455/232.1; 375/345; 342/357.22

(58) Field of Classification Search
USPC ........ 455/232.1, 234.1, 427, 260, 333, 343.1, 455/574; 375/322, 324, 327, 345, 350; 342/357.22, 357.39

See application file for complete search history.

(56) References Cited

U.S. PATENT DOCUMENTS

| | | | |
|---|---|---|---|
| 5,923,286 A | 7/1999 | Divakaruni | |
| 6,442,481 B2 | 8/2002 | Miller | |
| 6,512,803 B2 | 1/2003 | Heinzl et al. | |
| 6,985,097 B2 * | 1/2006 | Ueno et al. | 341/118 |
| 7,639,724 B2 | 12/2009 | Tso et al. | |
| 7,801,481 B2 | 9/2010 | Knight | |

* cited by examiner

*Primary Examiner* — Quochien B Vuong
(74) *Attorney, Agent, or Firm* — Bever, Hoffman & Harms, LLP; Jeanette S. Harms

(57) ABSTRACT

A GPS baseband architecture provides flexibility and power consumption and chip area usage advantages. The GPS baseband architecture includes a first stage having a preamplifier coupled to a low noise amplifier, which is coupled to a mixer. A PLL provides the mixer with a frequency to convert a signal to a higher intermediate (IF) frequency. The output of the mixer is fed to a poly-phase filter. The output of the poly-phase filter is fed to a programmable gain amplifier (PGA), whose output is fed to an analog-to-digital converter (ADC) to produce an output GPS signal. A saturation bit of the ADC is used to control the PGA through a digital amplifier gain control (AGC) circuit.

29 Claims, 3 Drawing Sheets

GPS BASEBAND ARCHITECTURE

RELATED APPLICATIONS

This application is a continuation of U.S. patent application Ser. No. 11/967,891, entitled "GPS Baseband Architecture" filed Dec. 31, 2007.

FIELD OF THE INVENTION

Embodiments of the present invention relate to a GPS (Global Positioning System baseband architecture based on a lower order poly-phase filter followed by one PGA (Programmable Gain Amplifier) and a simpler AGC (Amplifier Gain Control) machine where the control is based on a calculation of the average time the ADC is saturated.

BACKGROUND OF THE INVENTION

Knowledge of one's position is required for numerous endeavors in modern life. By way of example, surveyors require precise positioning for land surveys and construction projects. Shipping companies implement tracking devices in containers requiring position information to monitor their locations. Numerous types of service companies use position information to track the locations of their service personnel as they make various service calls to ensure they're not deviating from their assignments. Drivers use knowledge of their position to obtain driving directions from one point to another and to determine the whereabouts of points of interest including hotels, restaurants, gas stations, and landmarks. This is but a small sample of the types of everyday endeavors that require knowledge of one's position on or near the earth.

A well-known system for providing such positioning information is the Global Positioning System (GPS). GPS satellites provide ranging codes to allow receivers to determine their positions. These codes are known as the coarse/acquisition (C/A) code and the precision (P) code. Each C/A code is unique to the satellite it is on and substantially orthogonal to all other C/A codes in the GPS system. Similarly, each P code is unique to the satellite transmitting it, and substantially orthogonal to all other P codes for satellites in the GPS system.

The C/A and P ranging codes are modulated onto L-band carriers L1 and L2 for transmission. The L1 carrier frequency is 1575.42 MHz and the L2 carrier frequency is 1227.6 MHz.

Using received ranging codes, a GPS receiver can determine pseudoranges from a number of GPS satellites in its view. Using the determined pseudoranges, the position of the receiver can be determined by solving a well-known set of non-linear equations. Although data from only 3 GPS satellites may be sufficient to determine position in some applications, data from at least 4 GPS satellites is preferred to account for discrepancies between the GPS and receiver clocks. While the C/A code is always available, to prevent spoofing or other man-made data corruption, the P code may be encrypted, and may not be available for general position determination.

Another position determining system planned for operation in the near future is the Galileo system. The Galileo system uses position determining techniques to those described above for the GPS system. However, the Galileo system will operate using a different signal structure than the GPS system described above.

The GPS signals described above can be detected by a GPS baseband architecture apparatus. Such apparatus can be included on an integrated circuit chip and include mixed analog and digital processing capabilities. Important in such chips is minimizing power consumption and overall layout area required for processing GPS signals. Conventional GPS baseband architectures typically use a high order filter after mixing the received GPS signal to an intermediate frequency. Such high order filters increasing the power consumption and the required layout area inside the chip. The GPS baseband architecture normally uses a high order filter after the mixer, increasing notably the power consumption and the required layout area inside the chip.

Another desirable feature of a GPS baseband architecture is flexibility. GPS is not the only satellite based positioning system. Others include the GLONASS system and the soon-to-be operational Galileo system.

Consequently, what is needed is a new GPS baseband architecture that not only is efficient in terms of power consumption and space usage, but also provides flexibility to enable users to determine their position using any of a number of available positioning systems.

BRIEF SUMMARY OF THE INVENTION

The foregoing needs are met by a GPS baseband architecture according to embodiments of the present invention. In one such embodiment of the present invention that improves used layout area and power consumption inside the chip where the architecture is implemented, while providing desired flexibility, the GPS baseband architecture includes at least a poly-phase filter, a programmable gain amplifier (PGA), an analog-to-digital converter (ADC) and a digital analog gain control (AGC) machine.

Preferably, the poly-phase filter is programmable to operate at a higher center frequency than conventional GPS receivers, and to provide desired flexibility in operation. For example, in one embodiment of the present invention, the poly-phase filter is configurable to operate at center frequencies between 3 and 10 MHz. To increase flexibility, in one embodiment of the present invention, the poly-phase filter is programmable to operate at any desired center frequency between 3 and 10 MHz, and preferably at the center frequencies of 3, 4, 6, 7, and 10 MHz. Furthermore, the poly-phase filter is programmable to have a bandwidth of 4 or 6 MHz.

The programmability of the poly-phase filter allows the GPS baseband architecture of embodiments of the present invention to be adjustable for use GPS signals of higher and lower resolution as well as positioning signals associated with the Galileo and GLONASS systems. Because of the higher center frequency, the poly-phase filter used in embodiments of the present invention can be significantly simpler (lower order) than conventional implementations.

In embodiments of the present invention, the programmable gain amplifier (PGA) provides for gain control of the output of the poly-phase filter to ensure the ADC outputs appropriate signal levels. For example in one embodiment of the present invention, the PGA is controlled by a digital automatic gain control (AGC) so that the output of the ADC is saturated no more than 30 percent of the time.

To maintain the saturation of the output of the ADC to within 30 percent, the ADC output is fed back through an AGC machine to the PGA to control the characteristics of the data output by the ADC. For example, in one embodiment of the present invention, the ADC is a 3-level ADC. As a result the ADC provides a four level output. In such an embodiment the PGA is controlled by the AGC so that the signal takes on one of the extreme values no more than 30 percent of the time.

In embodiments of the present invention, the output of the ADC is fed back to the PGA through a digital AGC machine. The digital AGC machine controls the gain using the saturation bit of the ADC.

A GPS baseband architecture according to embodiments of the present invention, is optimized both in power consumption and used silicon area due not only to the lower order of the poly-phase filter and the programmable gain amplifier, but also the simplicity of the amplifier gain control machine, in which the gain control is done by calculation of the average time in which the ADC is saturated.

Moreover, the programmability of the poly-phase filter in embodiments of the present invention provides a GPS baseband architecture according to an embodiment of the present invention a very flexible architecture. For example, the programmability of the poly-phase filter allows selection of bandwidth and center frequencies typically used by the industry. The center frequency can be selected with a single clock and a PLL synthesizer that is flexible to convert the whole range of frequencies.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention is described with reference to the accompanying drawings. The drawing in which an element first appears is typically indicated by the leftmost digit in the corresponding reference number.

DETAILED DESCRIPTION OF THE INVENTION

The present invention provides a GPS baseband architecture that improves used layout area and power consumption inside the chip, while providing desired flexibility. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
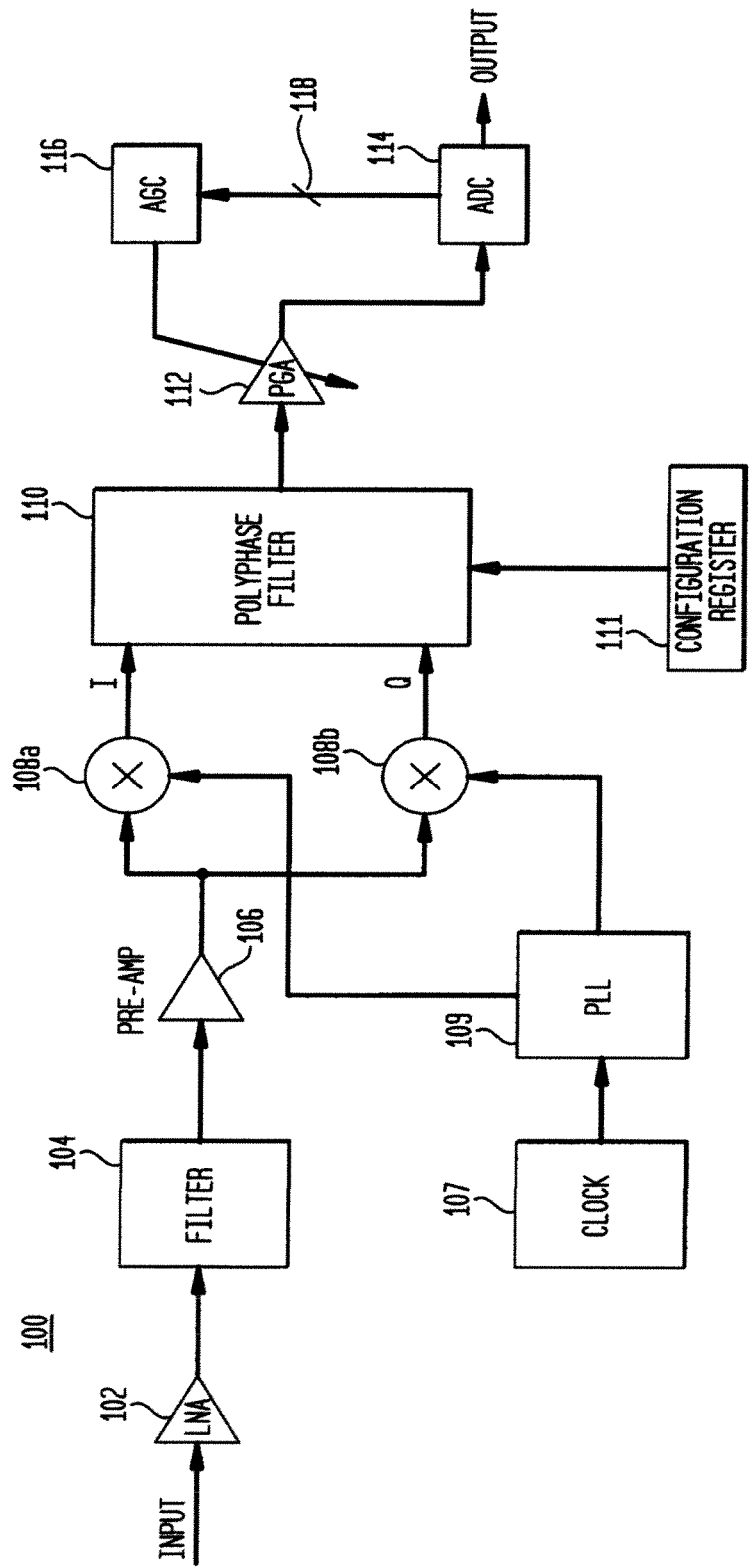
FIG. 1 is a schematic diagram of the GPS baseband architecture according to an embodiment of the present invention.

FIG. 1 is a schematic diagram of a GPS baseband architecture 100 according to an embodiment of the present invention. An input signal intercepted from a GPS satellite is applied to a low noise amplifier (LNA) 102, the output of which is applied to a ceramic resonance filter (SAW) filter 104. LNA 102 amplifies the signal prior to the SAW filter to keep good performance on the signal as it passes through a SAW filter 104. SAW filter 104 selects GPS bandwidth and rejects external interferers from other bands. The output of SAW filter 104 is input to a preamplifier 106. Preamplifier 106 is to amplify the signal prior to mixing it to ease the performance of the mixers. The output of preamplifier 106 is input to one input of mixer 108a and one input of mixer 108b. LNA 102, SAW filter 104 and mixers 108a and 108b can be considered a first state of GPS baseband architecture 100.

A phase-locked loop PLL 109 controlled by a clock 107 is configured to provide a frequency such that the output of mixers 108a and 108b will be an Intermediate Frequency (IF) signal having a frequency corresponding to a desired center frequency of a poly-phase filter 110. The output of mixer 108a is the inphase (I) component of the IF signal, and the output of mixer 108b is the quadrature (Q) component of the IF signal. In one embodiment of the present invention, the output of PLL 109 is shifted in phased by −90 degrees prior to being applied to mixer 108b.

In one embodiment of the present invention, PLL 109 is implemented as a fractional N synthesizer. One of the advantages of the fns is that you can use a range of clocks to achieve a range of frequencies. Thus, you can use the same PLL in multiple applications.

The inphase (I) and quadrature (Q) components of the IF signal are input to a poly-phase filter 110. In embodiments of the present invention, poly-phase filter 110 is configured to operate at higher center frequencies than used in conventional systems. Because a higher center frequency is used, poly-phase filter 110 can be a simpler filter (lower order) than used in conventional systems. For example, in one embodiment of the present invention, poly-phase filter 110 is a second order poly-phase filter. Preferred center frequencies for use in embodiments of the present invention include 3, 4, 6, 7, and 10 MHz depending on the particular positioning system used. For example, one set of parameters for processing GPS signals in the 1575.42 MHz band is an IF of 4 MHz and a BW of 4 MHZ.

To increase flexibility in one embodiment of the present invention, the poly-phase filter is programmable. For example, in one embodiment of the present invention, the poly-phase filter is programmable to operate at any desired center frequency between 3 and 10 MHz, and preferably at the center frequencies of 3, 4, 6, 7, and 10 MHz. Furthermore, the poly-phase filter is programmable to have a bandwidth of 4 or 6 MHz This allows the present invention to be used in multiple applications including, for example, high resolution GPS, low resolution GPS and Galileo. Thus, in one embodiment of the present invention, poly-phase filter 110 is configured for GPS as follows: a target frequency of 1575.42 MHz with an IF center frequency of 4 MHz, and BW of 4 MHz. In another embodiment of the present invention, poly-phase filter 110 is configured for Galileo as follows: a target frequency of 1575.42 MHz, 6 Mhz IF and 6 MH BW. In one embodiment, such configuration is automatic. In another embodiment of the present invention, a user configures the center frequency and bandwidth of poly-phase filter 110.

For example, in one embodiment of the present invention, polyphase filter 110 is implemented as a $2^{nd}$ order Chebyshev type I Polyphase filter that removes the image band and all ADC aliasing bands, keeping only the wanted signal and combining I&Q into one signal. Filter group delay deviation and frequency response are symmetrical around the signal, for maximum performance. There is also a 100 kHz-3 dB cut-off first-order high-pass filter to remove the DC offset and 1/F noise from the RF front-end. The high-pass filter also works together with the Polyphase filter to set the IF bandwidth.

Figure 3:
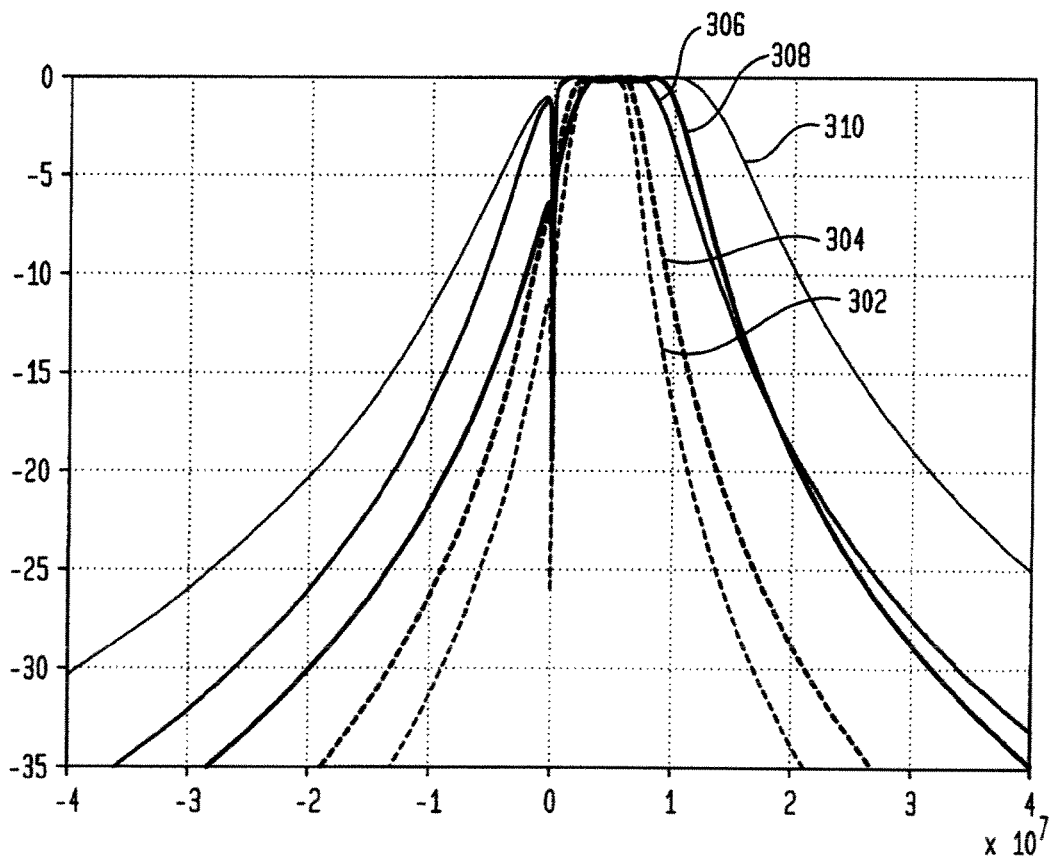
FIG. 3 illustrates exemplary transfer functions for a polyphase filter for several modes of operation according to an embodiment of the present invention.
Figure 4:
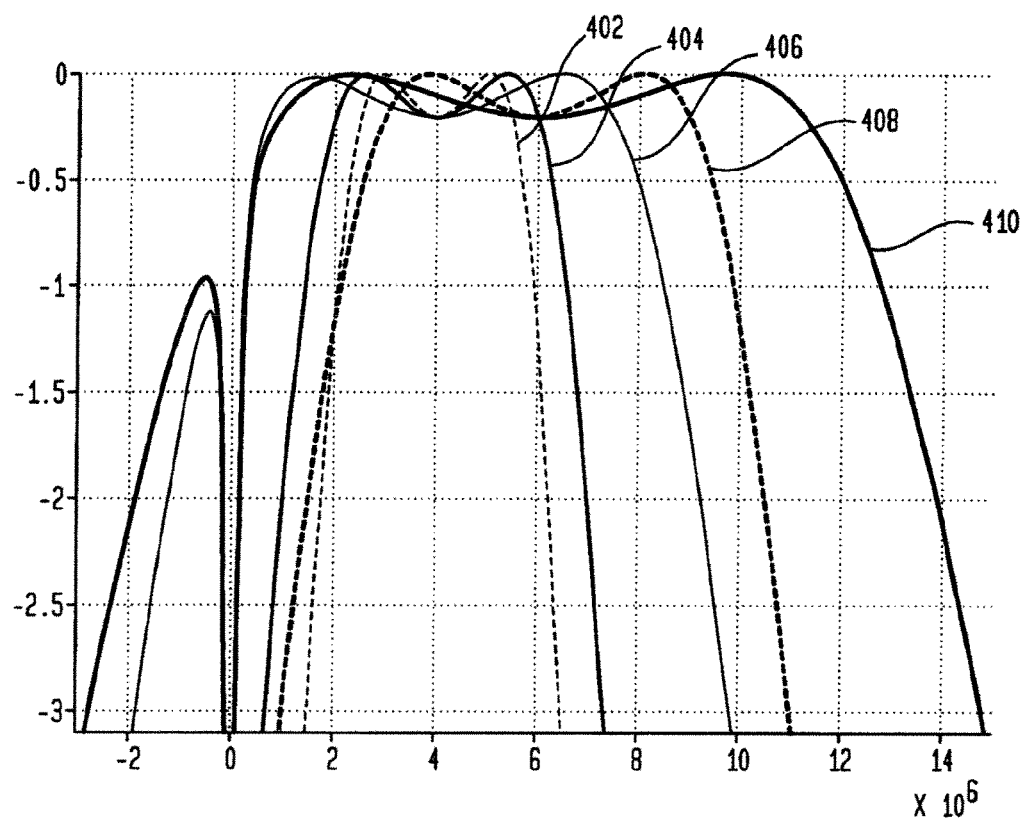
FIG. 4 illustrates zoomed transfer functions for a polyphase filter for several modes of operation according to an embodiment of the present invention.

For flexibility, in an exemplary embodiment of the present invention, there are 5 modes of operation directed to requirements for GPS/Galileo demodulation on the L1 band. For example, one embodiment of the present invention provides the following modes:

Mode 1: GPS Best Sensitivity
Bandwidth: 3 MHz
Center frequency: 4.092 MHz
Mode 2: GPS Nominal Sensitivity
Bandwidth: 4 MHz
Center frequency: 4.092 MHz
Mode 3: GPS High Accuracy/Galileo
Bandwidth: 7 MHz
Center frequency: 4.092 MHz
Mode 4: Galileo
Bandwidth: 6 MHz
Center frequency: 6 MHz
Mode 5: Galileo
Bandwidth: 10.5 MHz
Center frequency: 6 MHz Transfer functions corresponding to the operation of polyphase filter 110 for these modes of operation are shown in FIGS. 3 and 4. FIG. 4 is a zoomed version of the curves of FIG. 3 at the −3 dB points. Mode 1 is represented by curves 302 and 402. Mode 2 is represented by curves 304 and 404. Mode 3 is represented by curves 306 and 406. Mode 4 is represented by curves 308 and 408. Mode 5 is represented by curves 310 and 410.

In one embodiment of the present invention, programmability is provided using a configuration register 111. Configuration register may be coupled directly to poly-phase filter 110 or may be coupled to a controller (not shown) that configures poly-phase filter 110 in accordance with the contents of configuration register 111.

Table 1 provides bit definitions for a configuration register, for example register 0x9 according to an embodiment of the present invention for configuring polyphase filter 110.

TABLE 1

IF Filter Register configuration Description
REGISTER 0x9 - LPF Control

| 7 | tuningen | register value | LPF Tuning enable<br>0 -> disabled<br>1 -> enabled | 0x0 |
|---|---|---|---|---|
| 6 | lpfmode<2> | register value | LPF Mode | 0x0 |
| 5 | lpfmode<1> | or | 000 -> Mode 3 (same as 011) | 0x0 |
| 4 | lpfmode<0> | If monitor = 1:<br>vcotunout<4:0> | 001 -> Mode 1<br>010 -> Mode 2<br>011 -> Mode 3<br>100 -> Mode 4<br>101 -> Mode 5<br>11x -> reserved | 0x0 |
| 3 | reserved | register value | — | 0x0 |
| 2 | reserved | register value | — | 0x0 |
| 1 | reserved | register value | — | 0x0 |
| 0 | reserved | or<br>If monitor = 1:<br>tunval<9:8> | — | 0x0 |

Figure 2:
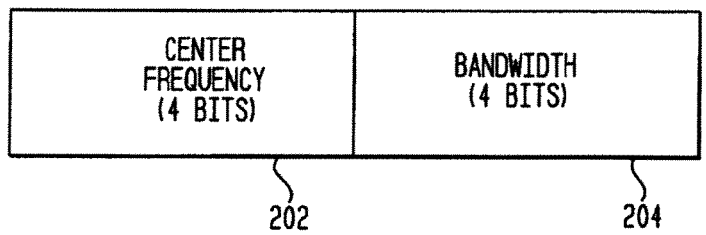
FIG. 2 illustrates an exemplary configuration register according to an embodiment of the present invention.

FIG. 2 illustrates another exemplary configuration register 111 according to an embodiment of the present invention. As shown in FIG. 2, configuration register 111 is divided into 2 portions. A first portion 202 of configuration register 111 includes 4 bits that are set to a value corresponding to a desired center frequency for poly-phase filter 110. As described above in one embodiment of the present invention, such center frequencies include, for example, 3, 4, 6, 7, and 10 MHz. A second portion of configuration register 111 includes 4 bits that are set to a value corresponding to a desired bandwidth. As described above, in one embodiment of the present invention, such bandwidths include, for example, 4 and 6 MHz.

In embodiments of the present invention, poly-phase filter 110 is provides the effect of a low pass filter shifted in frequency such that it acts as a bandpass filter centered at the desired center frequency. This provides better out-of-band attenuation with a lower order filter than would be attainable using a conventional bandpass filter. This behavior effectively filters sufficiently attenuates any image folding due to negative frequency bands when the I and Q components of the IF signal are converted into a real representation through poly-phase filter 110.

The programmability of the poly-phase filter allows the GPS baseband architecture of embodiments of the present invention to be adjustable for use GPS signals of higher and lower resolution as well as positioning signals associated with the Galileo system. Because of the higher center frequency, the poly-phase filter used in embodiments of the present invention can be significantly simpler (lower order) than conventional implementations.

The output of poly-phase filter 110 is coupled to the input of a programmable gain amplifier (PGA) 112. PGA 112 controls gain after poly-phase filter 110. Thus, PGA 112 is responsible for the gain of the input to ADC 114 to ensure ADC 114 outputs appropriate signal levels. For example in one embodiment of the present invention, PGA 112 is controlled by a digital automatic gain control (AGC) 116 (described below) so that the output of the ADC is saturated no more than 30 percent of the time.

The output of PGA 112 is coupled to the input of an analog-to-digital converter (ADC) 114. ADC 114 outputs the detected GPS signal as the output of GPS baseband architecture 100. ADC 114 also provides an input to a digital amplifier gain control (AGC) machine 116.

To maintain the saturation of the output of the ADC 114 within 30 percent, the output of ADC 114 is fed back through AGC machine 116 to PGA 112 to control the characteristics of the data output by ADC 114.

For example, in one embodiment of the present invention, ADC 114 is implemented as a 3-level structure. The 3-level structure include three comparators. As a result the ADC provides a four level output. In such an embodiment the PGA is controlled by the AGC so that the signal takes on one of the extreme values no more than 30 percent of the time. For example, in one embodiment of the present invention, the ADC is coded such that the lowest level is coded 11, the next level is coded 00, the next level is coded 01, and the highest level is coded 10. In such a coding scheme, the ADC is said to be saturated if the signal level falls in either of the extreme levels, i.e., outputs a value of 11 or 10. It can be seen that the extreme level (the saturation levels) can be identified by the most significant bit (MSB) of the ADC output. This bit is termed the "saturation bit" 118.

By monitoring saturation bit 118, it can be determined how much of the detected signal is saturated, as well as control the amount of saturation. An AGC machine 116 so monitors saturation bit 118 to control programmable gain amplifier 112 such that the output of ADC 114 is saturated no more than 30 percent of the time. Thus, using saturation bit 118, AGC machine 116 determines the average time which the output of ADC 114 is saturated. Using this determination, AGC machine 116 controls PGA 112 so that the output of ADC 114 is saturated no more than 30 percent of the time.

While saturation bit 118 is one way to monitor ADC saturation, what is important is that ADC saturation is monitored and controlled. Numerous methods may be used to identify and control saturation. For example, using the coding scheme for the ADC output where the lowest level is 00, the next higher level, 01, the next higher level 10, and the highest level 11, the output bits of ADC 114 could be applied to an inverted exclusive OR ($\overline{XOR}$) function. In such case, the output of the $\overline{XOR}$ would identify saturation, and could be used by AGC machine 116 to appropriately control PGA 112 to achieve the desired ADC 114 saturation level.

Although 30 percent saturation is used a default, the programmable nature of digital AGC 116 allows other values to be used. Thus, if a user desired that the output of ADC 114 be saturated no more than 25 percent of the time, for example, the user could configure AGC 116 such that it controlled PGA 112 so that ADC 114 would output a saturated signal no more than 25 percent of the time. In one embodiment of the present invention, for example, AGC configuration is implemented using a configuration register (not shown) similar in concept to registration register 111 (described above) with only one value corresponding to the desired ADC 114 saturation level.

Poly-phase filter 110, PGA 112, ADC 114, and AGC 116 can be considered a second stage of GPS baseband architecture 100.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors. For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

The invention claimed is:

1. A satellite-based positioning system comprising:
a low noise amplifier (LNA) generating an LNA output;
a filter coupled to the LNA output, and generating a filter output;
a preamplifier coupled to the filter output, and generating a preamplifier output;
a mixer coupled to the preamplifier output, and generating an intermediate frequency provided as a mixer output;
a poly-phase filter coupled to the mixer output, and generating a poly-phase filter output;
an analog-to-digital converter (ADC) generating an output of the satellite-based positioning system architecture; and
an ADC saturation unit coupled to the poly-phase filter and the ADC, the ADC saturation unit configured to prevent saturation of the ADC more than a predetermined percent of time,
wherein the ADC saturation unit is configured to implement an inverted exclusive OR function.

2. The satellite-based positioning system of claim 1, wherein the ADC saturation unit includes:
a programmable gain amplifier (PGA) coupled to the poly-phase filter output, and generating a PGA output; and
an amplifier gain control (AGC) machine coupled to an ADC output, and generating a control input of the PGA, thereby closing a control gain loop.

3. The satellite-based positioning system of claim 2, wherein the AGC machine is a digital AGC machine configured to monitor bits provided by the ADC, the bits indicating an average time in which the ADC is saturated, the digital AGC machine controlling a PGA gain to ensure the ADC is saturated no more than the predetermined percent of the time.

4. The satellite-based positioning system of claim 1, wherein the poly-phase filter is a second order filter.

5. The satellite-based positioning system of claim 1, wherein the poly-phase filter is configured to work at a bandwidth between 2 and 10 MHz.

6. The satellite-based positioning system of claim 1, wherein the poly-phase filter is configured to work at a center frequency between 4 and 6 MHz.

7. The satellite-based positioning system of claim 1, further including a configuration register coupled to the poly-phase filter.

8. The satellite-based positioning system of claim 7, wherein the configuration register includes a first portion for storing bits corresponding to a desired center frequency and a second portion for storing bits corresponding to a desired bandwidth.

9. A satellite-based positioning system comprising:
a low noise amplifier (LNA) generating an LNA output;
a filter coupled to the LNA output, and generating a filter output;

a preamplifier coupled to the filter output, and generating a preamplifier output;

a mixer coupled to the preamplifier output, and generating an intermediate frequency provided as a mixer output;

a poly-phase filter coupled to the mixer output, and generating a poly-phase filter output;

an analog-to-digital converter (ADC) generating an output of the satellite-based positioning system architecture; and an ADC saturation unit coupled to the poly-phase filter and the ADC, the ADC saturation unit configured to prevent saturation of the ADC more than a predetermined percent of time, wherein the ADC is implemented as a 3-level structure, the ADC configured to generate a two-bit code, which provides a four-level saturation output, and wherein the ADC saturation unit is configured to implement an inverted exclusive OR function.

10. The satellite-based positioning system of claim 9, wherein the 3-level structure includes three comparators.

11. The satellite-based positioning system of claim 9, wherein the ADC saturation unit includes:
a programmable gain amplifier (PGA) coupled to the poly-phase filter output, and generating a PGA output; and
an amplifier gain control (AGC) machine coupled to an ADC output, and generating a control input of the PGA, thereby closing a control gain loop.

12. The satellite-based positioning system of claim 11, wherein the AGC machine is a digital AGC machine configured to monitor bits provided by the ADC, the bits indicating an average time in which the ADC is saturated, the digital AGC machine controlling a PGA gain to ensure the ADC is saturated no more than the predetermined percent of the time.

13. The satellite-based positioning system of claim 9, wherein the poly-phase filter is a second order filter.

14. The satellite-based positioning system of claim 9, wherein the poly-phase filter is configured to work at a bandwidth between 2 and 10 MHz.

15. The satellite-based positioning system of claim 9, wherein the poly-phase filter is configured to work at a center frequency between 4 and 6 MHz.

16. The satellite-based positioning system of claim 9, further including a configuration register coupled to the poly-phase filter.

17. The satellite-based positioning system of claim 16, wherein the configuration register includes a first portion for storing bits corresponding to a desired center frequency and a second portion for storing bits corresponding to a desired bandwidth.

18. A satellite-based positioning system comprising:
a low noise amplifier (LNA) generating an LNA output;
a filter coupled to the LNA output, and generating a filter output;
a preamplifier coupled to the filter output, and generating a preamplifier output;
a mixer coupled to the preamplifier output, and generating an intermediate frequency provided as a mixer output;
a poly-phase filter coupled to the mixer output, and generating a poly-phase filter output;
an analog-to-digital converter (ADC) generating an output of the satellite-based positioning system architecture; and
an ADC saturation unit coupled to the poly-phase filter and the ADC, the ADC saturation unit configured to prevent saturation of the ADC more than a predetermined percent of time,
further including a configuration register coupled to the poly-phase filter.

19. The satellite-based positioning system of claim 18, wherein the configuration register includes a first portion for storing bits corresponding to a desired center frequency and a second portion for storing bits corresponding to a desired bandwidth.

20. The satellite-based positioning system of claim 18, wherein the ADC saturation unit includes:
a programmable gain amplifier (PGA) coupled to the poly-phase filter output, and generating a PGA output; and
an amplifier gain control (AGC) machine coupled to an ADC output, and generating a control input of the PGA, thereby closing a control gain loop.

21. The satellite-based positioning system of claim 20, wherein the AGC machine is a digital AGC machine configured to monitor bits provided by the ADC, the bits indicating an average time in which the ADC is saturated, the digital AGC machine controlling a PGA gain to ensure the ADC is saturated no more than the predetermined percent of the time.

22. The satellite-based positioning system of claim 18, wherein the ADC is implemented as a 3-level structure, the ADC configured to generate a two-bit code, which provides a four-level saturation output.

23. The satellite-based positioning system of claim 22, wherein the 3-level structure includes three comparators.

24. The satellite-based positioning system of claim 22, wherein the ADC saturation unit is configured to implement an inverted exclusive OR function.

25. The satellite-based positioning system of claim 18, wherein the poly-phase filter is a second order filter.

26. The satellite-based positioning system of claim 18, wherein the poly-phase filter is configured to work at a bandwidth between 2 and 10 MHz.

27. The satellite-based positioning system of claim 18, wherein the poly-phase filter is configured to work at a center frequency between 4 and 6 MHz.

28. The satellite-based positioning system of claim 18, further including the configuration register coupled to the poly-phase filter.

29. The satellite-based positioning system of claim 28, wherein the configuration register includes a first portion for storing bits corresponding to a desired center frequency and a second portion for storing bits corresponding to a desired bandwidth.

* * * * *